United States Patent
Nammi

(10) Patent No.: US 9,713,165 B2
(45) Date of Patent: Jul. 18, 2017

(54) SCHEDULING A USER EQUIPMENT IN A COMMUNICATION SYSTEM

(71) Applicant: Telefonaktiebolaget L M Ericsson (publ), Stockholm (SE)

(72) Inventor: Sairamesh Nammi, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 271 days.

(21) Appl. No.: 14/398,911

(22) PCT Filed: May 3, 2013

(86) PCT No.: PCT/SE2013/050491
§ 371 (c)(1),
(2) Date: Nov. 4, 2014

(87) PCT Pub. No.: WO2013/169184
PCT Pub. Date: Nov. 14, 2013

(65) Prior Publication Data
US 2015/0117352 A1     Apr. 30, 2015

Related U.S. Application Data

(60) Provisional application No. 61/645,677, filed on May 11, 2012.

(51) Int. Cl.
*H04W 72/12*        (2009.01)
*H04L 12/00*        (2006.01)
(Continued)

(52) U.S. Cl.
CPC ....... *H04W 72/1226* (2013.01); *H04L 1/0031* (2013.01); *H04L 5/0042* (2013.01);
(Continued)

(58) Field of Classification Search
CPC ..... H04L 12/00; H04L 5/0042; H04L 5/0057; H04L 5/0055; H04L 1/0031;
(Continued)

(56) References Cited

U.S. PATENT DOCUMENTS

2008/0056414 A1* 3/2008 Kim ............... H04B 7/063
                                              375/347
2010/0135230 A1* 6/2010 Baker ............ H04L 1/0026
                                              370/329
(Continued)

FOREIGN PATENT DOCUMENTS

EP     2056505 A1    5/2009
EP     2568646 A1    3/2013
(Continued)

OTHER PUBLICATIONS

Nokia Siemens Networks, R1-121725 "UL feedback design for 4-Tx MIMO," Mar. 26-30, 2012, 3GPP TSG RAN WG1.*
(Continued)

*Primary Examiner* — Mark Rinehart
*Assistant Examiner* — Kenneth P Hunt
(74) *Attorney, Agent, or Firm* — Patent Portfolio Builders, PLLC

(57) ABSTRACT

The embodiments herein relate to a method in a base station (301) for scheduling a user equipment (305) in a communication system (300). The user equipment (205) receives a part of a CSI from the user equipment (305) in a TTI. The CSI comprises at least one of a CQI, a RI, a PCI, and an HARQ ACK/NACK. The user equipment (205) determines a type of data stream in which the part of the CSI was received and determines whether the type of data stream is equal to a predetermined type. The user equipment (205) schedules the user equipment (305) with a first transmission type when the type of data stream is equal to the predeter-
(Continued)

mined type with a second transmission type when the type of data stream is different from the predetermined type.

18 Claims, 18 Drawing Sheets

(51) Int. Cl.
*H04L 5/00* (2006.01)
*H04L 1/00* (2006.01)
*H04L 1/16* (2006.01)

(52) U.S. Cl.
CPC .......... *H04L 5/0053* (2013.01); *H04L 5/0055* (2013.01); *H04L 5/0057* (2013.01); *H04L 5/0058* (2013.01); *H04L 12/00* (2013.01); *H04W 72/1231* (2013.01); *H04L 1/0026* (2013.01); *H04L 1/1671* (2013.01); *H04W 72/1284* (2013.01)

(58) Field of Classification Search
CPC .............. H04L 1/0026; H04L 1/1671; H04W 72/1231; H04W 72/1226; H04W 72/1284
USPC .......................................................... 370/329
See application file for complete search history.

(56) References Cited

U.S. PATENT DOCUMENTS

2010/0167657 A1* 7/2010 Molnar ................. H04W 24/10
455/67.11
2011/0065448 A1* 3/2011 Song .................... H04B 7/0632
455/452.2
2014/0226735 A1* 8/2014 Zhang ................. H04B 7/0452
375/260

FOREIGN PATENT DOCUMENTS

EP         2618499 A2      7/2013
KR     20120029338 A      3/2012
WO     2013170161 A1    11/2013

OTHER PUBLICATIONS

S. Nammi, B. Göransson, E. Larsson and Q. Miao, "Design principles for four branch downlink MIMO for long term HSPA evolution," 2012 IEEE International Conference on Communications (ICC), Ottawa, ON, 2012, pp. 6051-6055. doi: 10.1109/ICC.2012.6364904 http://ieeexplore.ieee.org/stamp/stamp.jsp?tp=&arnumber=6364904&isnumber=6363631.*

Unknown, Author, "Feedback Channel design for four branch MIMO system", 3GPP TSG-RAN WG1 #68bis, R1-121762, Jeju, Korea, Mar. 26-30, 2012, 1-4.

Unknown, Author, "4-branch MIMO for HSDPA", Ericsson, 3GPP TSG RAN WG1 Meeting #65, R1-111763, Barcelona, Spain, May 9-13, 2011, 1-17.

Unknown, Author, "Feedback Channel Design for Four branch MIMO System", 3GPP TSG RAN WG1 Meeting #68, R1-120361, Agenda Item: 6.3.4, Dresden, Germany, Feb. 6-10, 2012, 1-7.

Unknown, Author, "UL feedback design for 4-Tx MIMO", 3GPP TSG RAN WG1 Meeting #68bis, R1-121725, Agenda item: 6.3.4, Jeju, Korea, Mar. 26-30, 2012, 1-4.

Office Action in EP application No. 13788135.5 mailed Aug. 17, 2015.

* cited by examiner

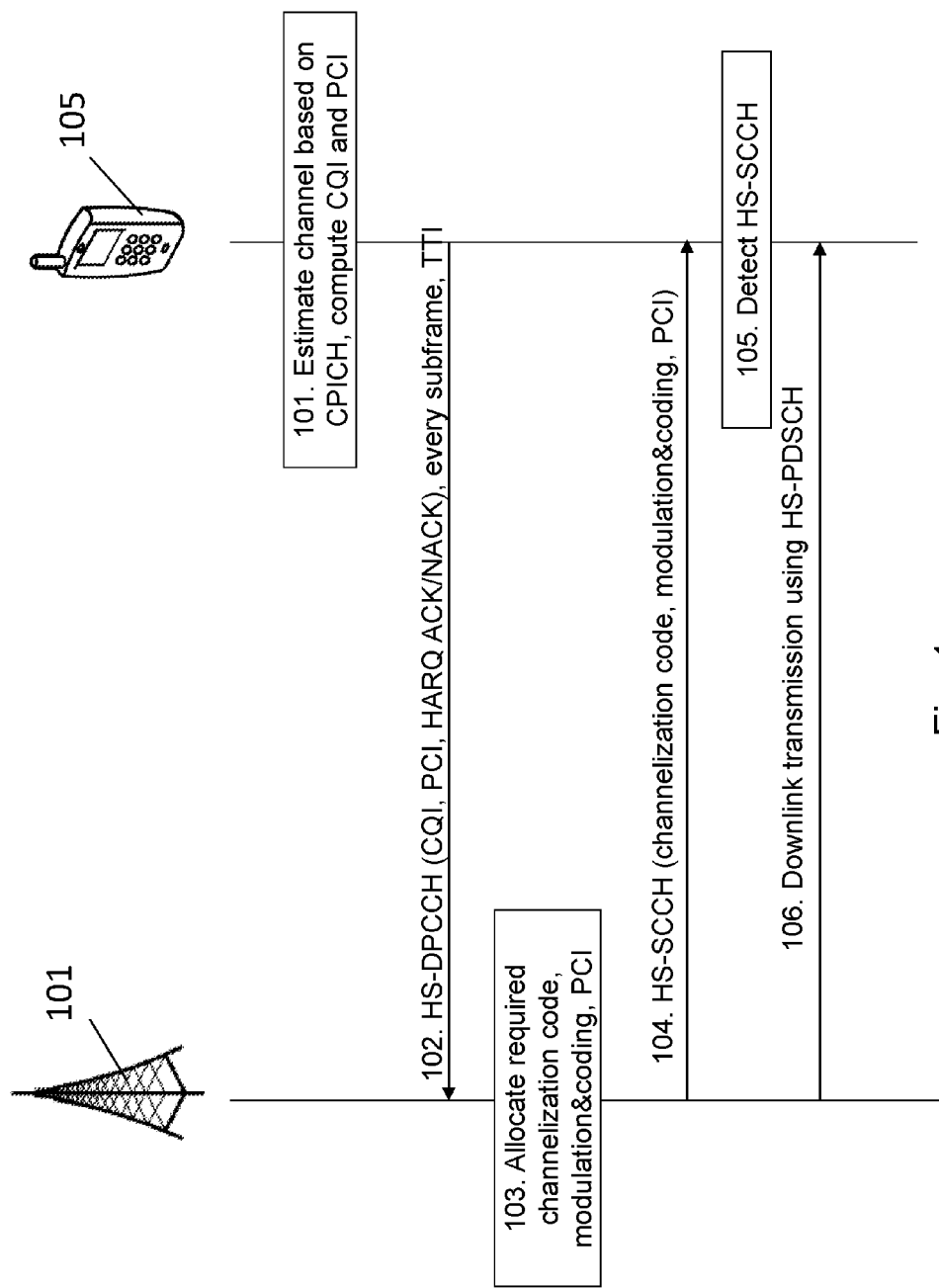

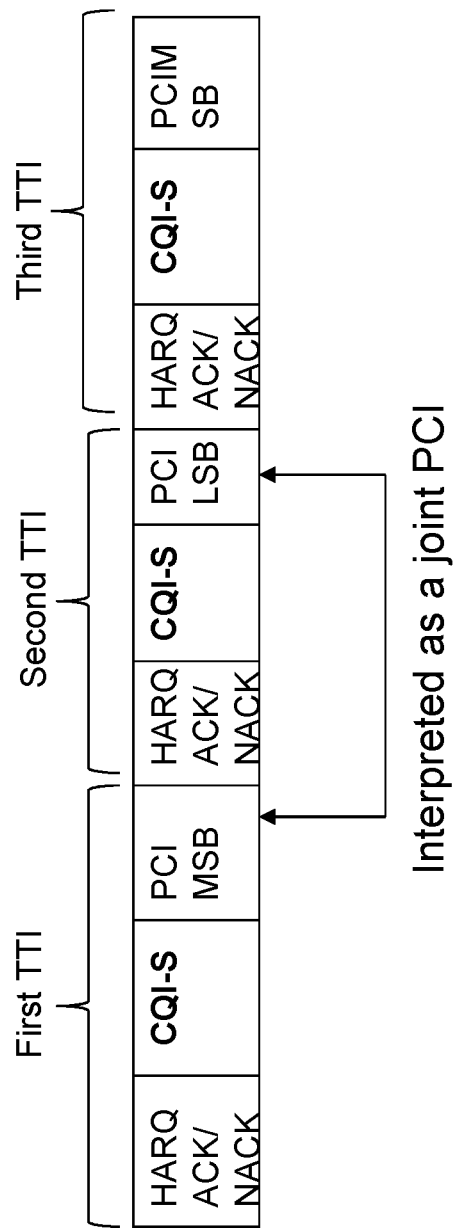
Fig. 5: HS-DPCCH structure for rank 1 transmissions

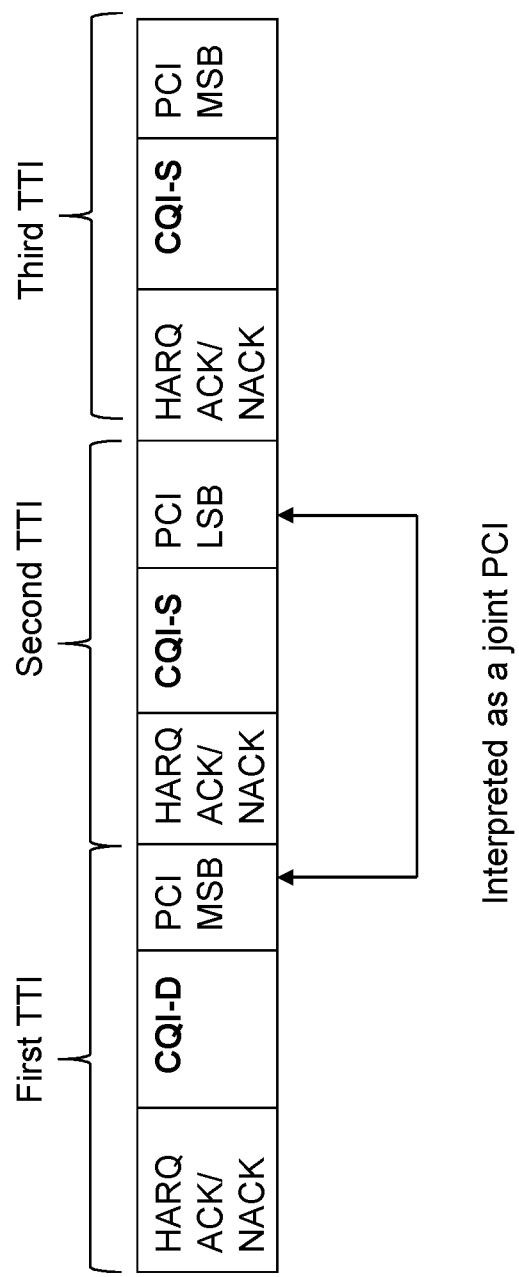
Fig. 6: HS-DPCCH structure for rank 2 transmission

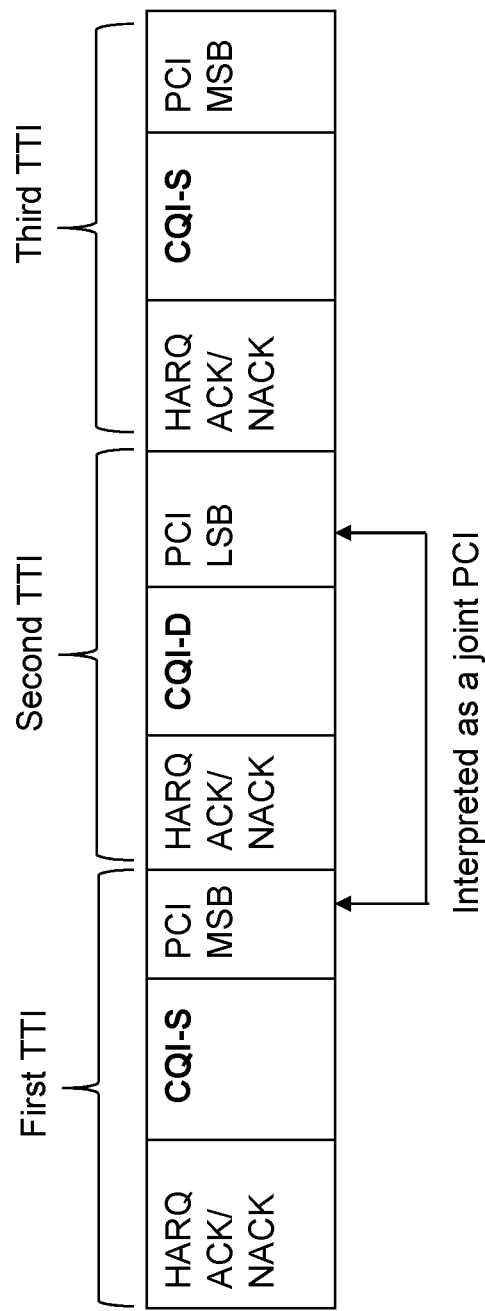
Fig. 7: HS-DPCCH structure for rank 3 transmission

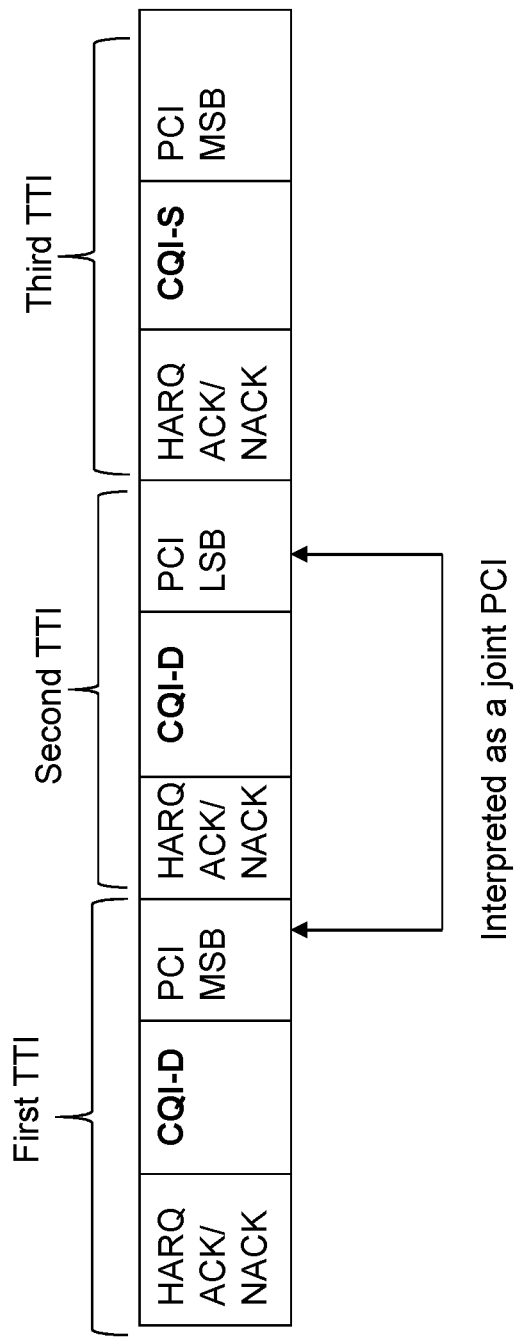
Fig. 8a: HS-DPCCH structure for rank 4 transmission

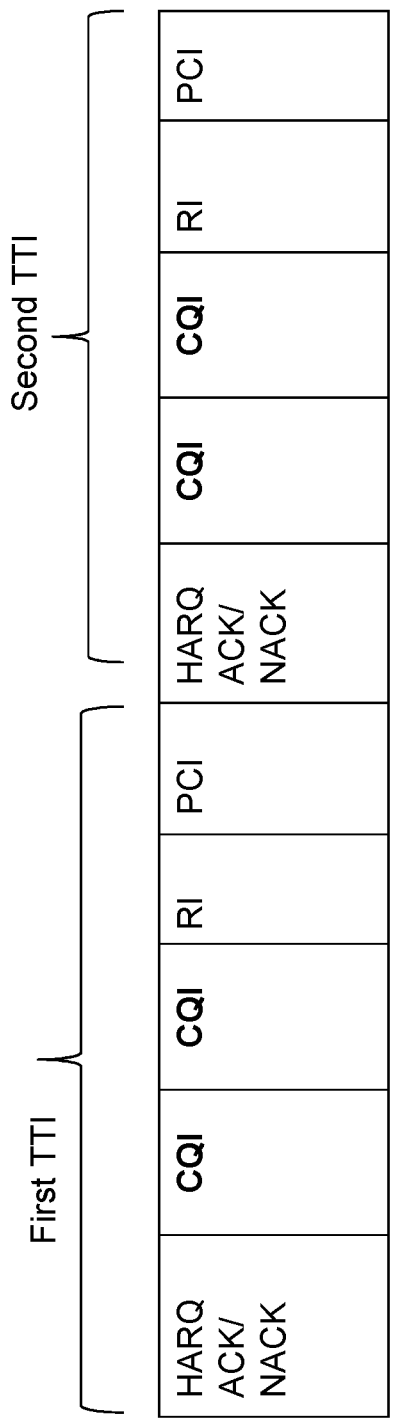
Fig. 8b: HS-DPCCH structure without time multiplexing

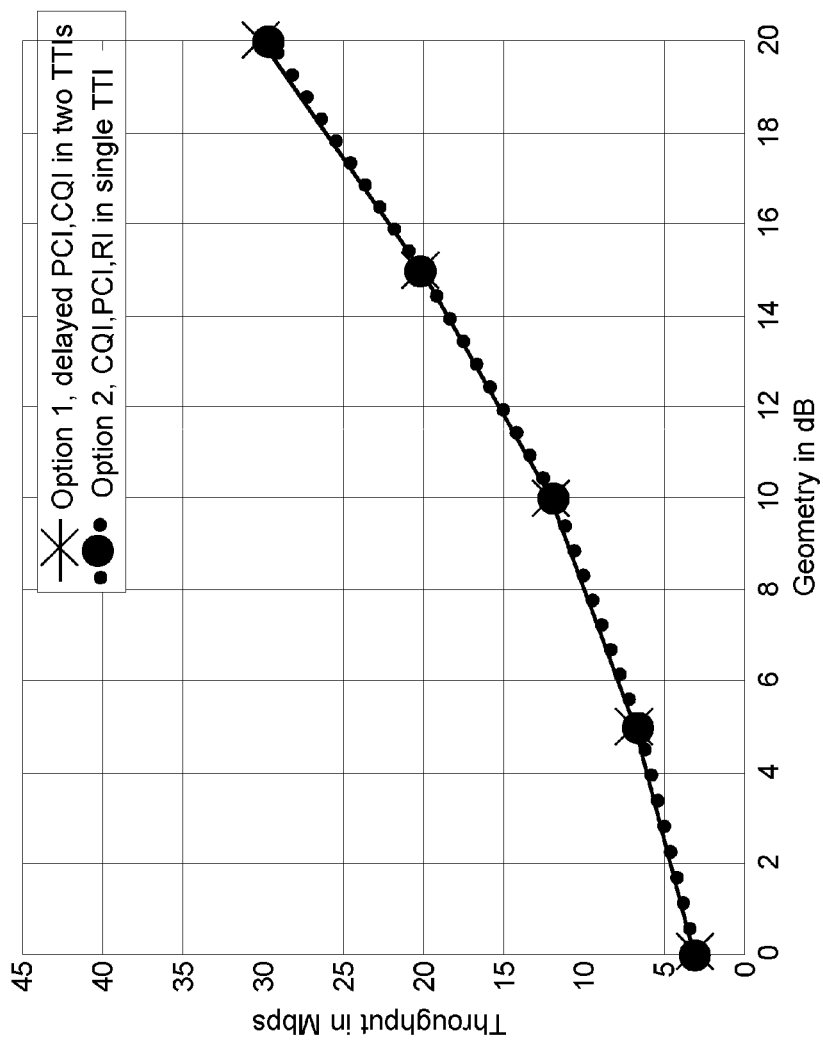
Fig. 14: Link performance for option 1 and 2 with rank 4 only transmissions

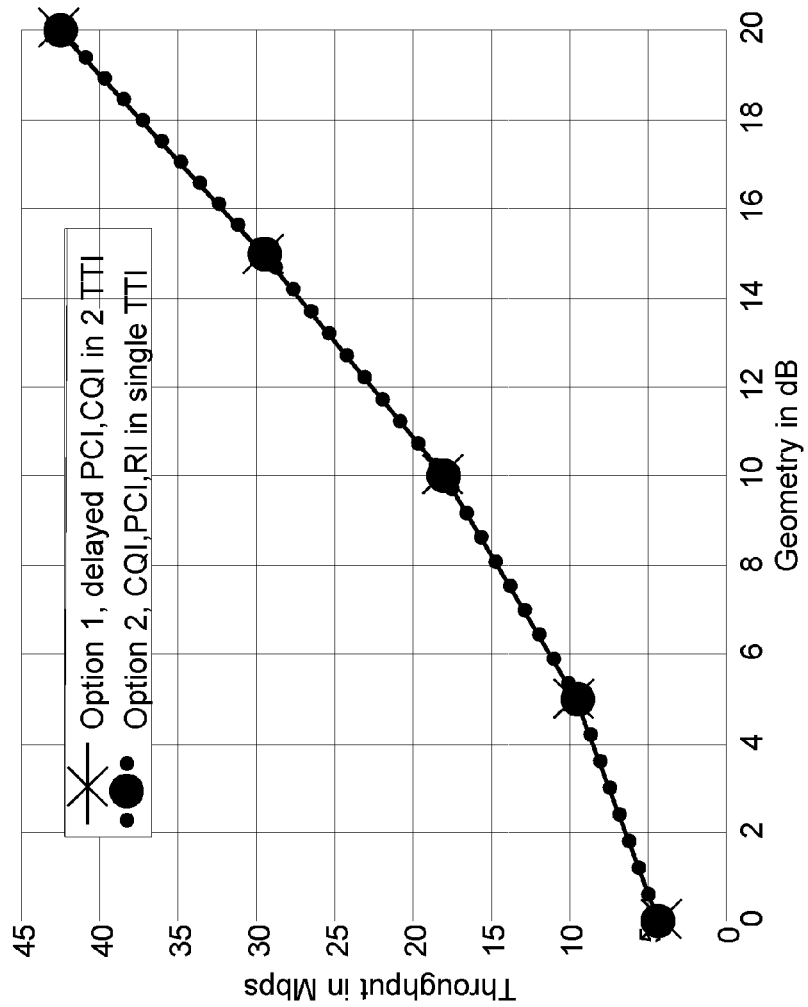
Fig. 15: Link performance for options 1 and 2 with rank 3 only transmissions

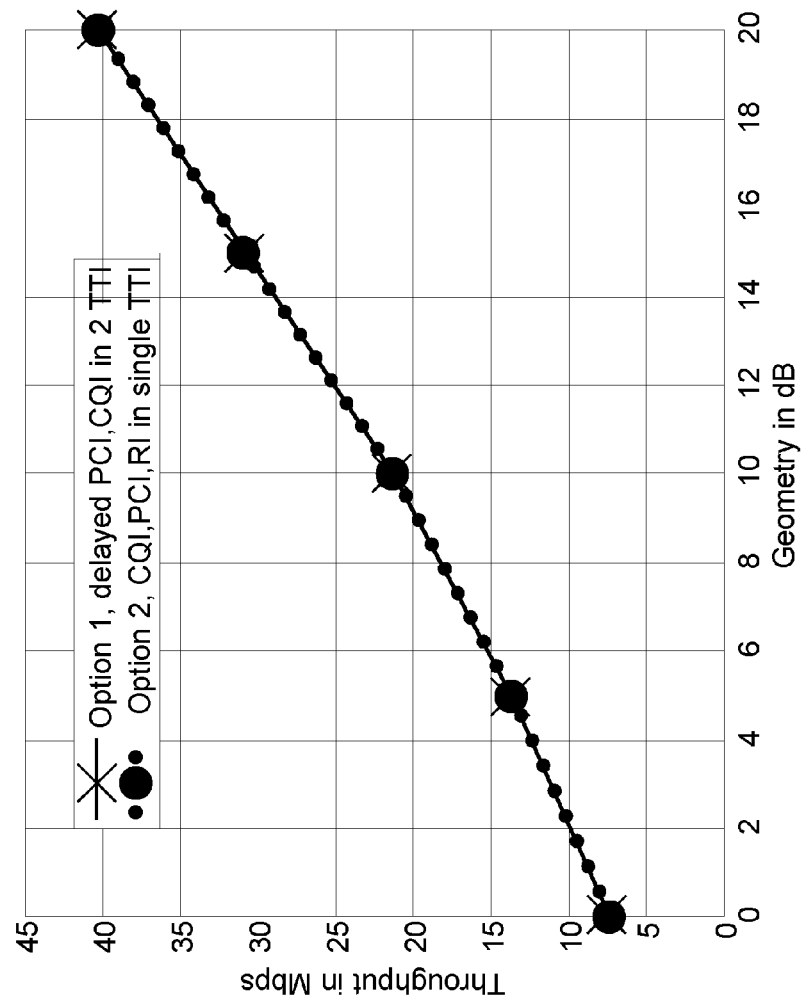
Fig. 16: Link performance for options 1 and 2 with rank 2 only transmissions

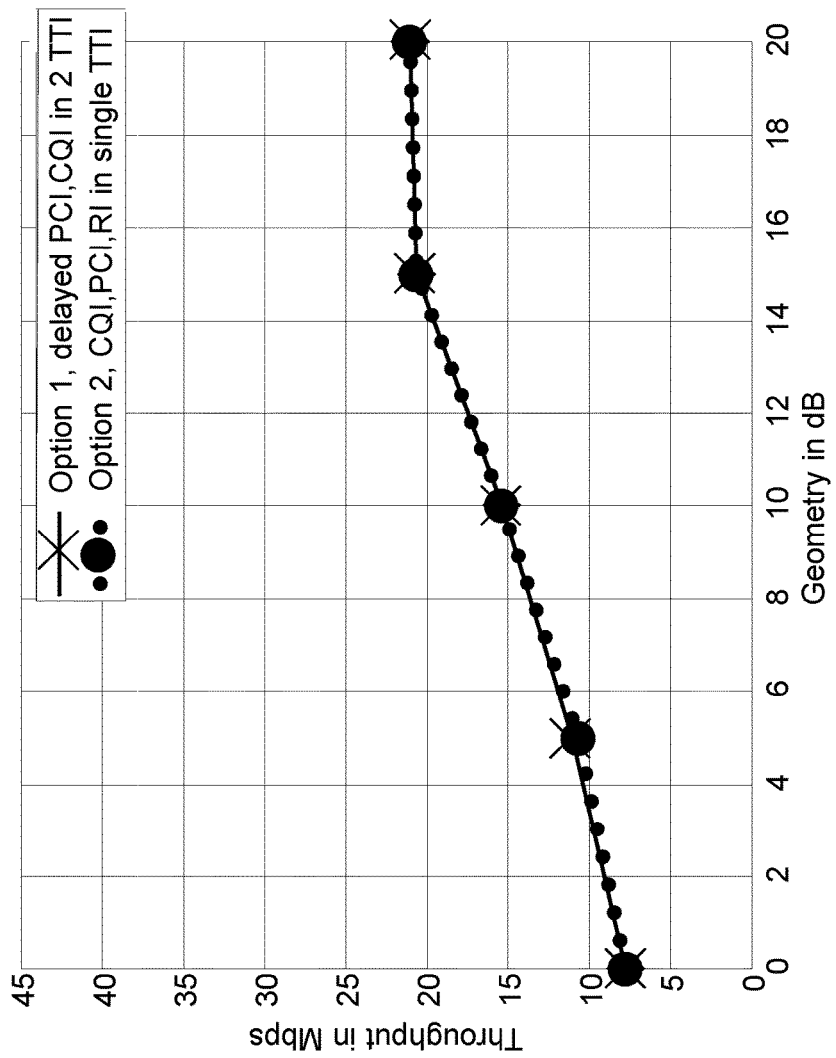
Fig. 17: Link performance for options 1 and 2 with rank 1 only transmissions

SCHEDULING A USER EQUIPMENT IN A COMMUNICATION SYSTEM

TECHNICAL FIELD

Embodiments herein relate generally to a user equipment, a method in the user equipment, a base station and a method in the base station. More particularly the embodiments herein relate to scheduling the user equipment in the communication system.

BACKGROUND

In a typical cellular network, also referred to as a wireless communications system or a communications system, a User Equipment (UE), communicates via a Radio Access Network (RAN) to one or more Core Networks (CNs).

A user equipment is a device that may access services offered by an operator's core network and services outside the operator's network to which the operator's radio access network and core network provide access. The user equipment may be any device, mobile or stationary, enabled to communicate over a radio channel in a communications system, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The user equipment may be portable, pocket storable, hand held, computer comprised or vehicle mounted mobile devices, enabled to communicate voice and/or data, via the radio access network, with another entity.

The user equipment is enabled to communicate wirelessly in the communications system. The communication may be performed e.g. between two user equipments, between a user equipment and a regular telephone and/or between the user equipment and a server via the radio access network and possibly one or more core networks, comprised within the communications system.

The radio access network covers a geographical area which is divided into cell areas. Each cell area is served by a base station. In some radio access networks, the base station is also called Radio Base Station (RBS), evolved NodeB (eNB), NodeB, B node, Radio Network Controller (RNC), Base Station Controller (BSC) etc. Each cell is identified by an identity within the local radio area, which is broadcast in the cell. The base stations communicate over an air interface operating on radio frequencies with the user equipment within range of the base stations.

Standardised by the third Generation Partnership Project (3GPP), High Speed Downlink Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows networks based on the Universal Mobile Telecommunications System (UMTS) to have higher data transfer speeds and capacity. In HSDPA, a new transport layer channel, High Speed-Downlink Shared Channel (HS-DSCH), has been added to the UMTS release 5 and further specifications. It is implemented by introducing three new physical layer channels: High Speed-Shared Control Channel (HS-SCCH), Uplink High Speed-Dedicated Physical Control Channel (HS-DPCCH) and High Speed-Physical Downlink Shared Channel (HS-PDSCH). The HS-SCCH informs the user equipment that data will be sent on the HS-DSCH, two slots ahead. The HS-DPCCH carries acknowledgment information and a current Channel Quality Indicator (CQI) of the user equipment. The CQI is then used by the base station to calculate the amount of data to send to the user equipment in the next transmission. The HS-PDSCH is the channel mapped to the above HS-DSCH transport channel that carries actual user data. HSPA may recover fast from errors by using Hybrid Automatic Repeat reQuest (HARQ). HARQ is a technique that enables faster recovery from errors in communications systems by storing corrupted packets in the receiving device rather than discarding them. Even if retransmitted packets have errors, a good packet may be derived from the combination of bad ones.

Long Term Evolution (LTE) also defines a number of channels in the downlink, i.e. in the direction from the base station to the user equipment, for example, the Physical Downlink Shared CHannel (PDSCH) which provides user data and the Physical Downlink Control CHannel (PDCCH) which provides control information.

Multiple Input Multiple Output (MIMO) refers to any communications system with multiple antennas at the transmitter and/or the receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and for combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the minimum required number of receiver antennas is equal to the number of separate data streams. 4×4 MIMO, also referred to as four branch MIMO, may support up to four data streams. In general, MIMO may be n×n MIMO, where n is the number of antennas and is a positive integer larger than 1. For example 2×2 MIMO, 8×8 MIMO, 16×16 MIMO etc.

Several new features are added for the long term HSPA evolution in order to meet the requirements set by the International Mobile Telecommunications-Advanced (IMT-A). An objective of these new features is to increase the average spectral efficiency. Spectral efficiency is a measure of how efficiently a limited frequency spectrum is utilized. It refers to a bit rate that may be transmitted over a given bandwidth in a specific communications system. One possible technique for improving downlink spectral efficiency would be to introduce support for four branch MIMO, i.e. utilize up to four transmit and four receive antennas to enhance the spatial multiplexing gains and to offer improved beamforming capabilities. Four branch MIMO provides up to 84 Mbps per 5 MHz carrier for high Signal to Noise Ratio (SNR) user equipments and improves the coverage for low SNR user equipments.

Spatial multiplexing mentioned above is a transmission technique in MIMO to transmit independently and separately encoded data signals, so-called data streams, from each of the multiple transmit antennas. Therefore, the space dimension is reused, or multiplexed, more than one time. If the transmitter has $N\_t$ antennas and the receiver has $N\_r$ antennas, the maximum spatial multiplexing order (the number of data streams) is:

$$N\_s = \min(N\_t, N\_r)$$

This means that N_s number of data streams may be transmitted in parallel, ideally leading to an N_s increase of the spectral efficiency (the number of bits per second and per Hertz (Hz) that may be transmitted over the wireless channel).

Channel feedback information, also referred to as Channel State Information (CSI), enables a scheduler to decide which user equipments that should be served in parallel. In communications systems, the CSI refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multiantenna systems. The user equipment is configured to send three types of channel feedback information, i.e. CSI: CQI, Rank Indicator (RI) and Precoding Matric Indicator (PMI). CQI is an important part of channel information feedback. The CQI provides the base station with information about link adaptation parameters which the user equipment supports at the time. The CQI is utilized to determine the coding rate and modulation alphabet, as well as the number of spatially multiplexed data streams. RI is the user equipment recommendation for the number of layers, i.e. the number of data streams to be used in spatial multiplexing. RI is only reported when the user equipment operates in MIMO mode with spatial multiplexing. The RI may have the values 1 or 2 in a 2×2 MIMO configuration, i.e. one or two transmitted data streams. The RI may have the values from 1 and up to 4 in a 4×4 MIMO configuration. The RI is associated with a CQI report. This means that the CQI is calculated assuming a particular RI value. The RI typically varies more slowly than the CQI. PMI provides information about a preferred precoding matrix in a codebook based precoding. PMI is only reported when the user equipment operates in MIMO mode. The number of precoding matrices in the codebook is dependent on the number of antenna ports on the base station. For example, four antenna ports enables up to 64 matrices dependent on the RI and the user equipment capability. A Precoding Control Indicator (PCI) indicates a specific precoding vector that is applied to the transmit signal at the base station.

Introduction of four branch MIMO will require a new feedback channel structure to send the CQI and PCI information to the base station. To reduce the signalling overhead at the downlink and uplink, it was recommended to use two codewords for four branch MIMO. For designing uplink signalling channel, e.g. DPCCH or HS-DPCCH, it was agreed to use a similar structure as that of two antenna MIMO, described in 3GPP release 7. When reporting CQI, RI and PCI, the CSI may be reported in two reporting intervals. This structure is attractive in terms that it requires minimal standards change. The performance with this structure is very close to that of ideal reporting. In general, the base station needs to wait for two reporting intervals to schedule the user equipment for data transmission. If the reporting period is configured to a high value, say for example 8 msec, the base station needs to wait 16 msec to schedule the user equipment. For a high speed user equipment, this introduces delay and the performance degradation is very severe.

An overview of channel quality reporting and base station procedures for two branch (2×2) MIMO (3GPP release 7 MIMO) will now be described with reference to FIG. 1. FIG. 1 shows the messages exchanged between base station 101 and the user equipment 105 during a typical data call set up. The method comprises the following steps, which steps may be performed in any suitable order:

Step 101

From the Common Pilot Indicator CHannel (CPICH), the user equipment 105 estimates the channel and computes the CQI and the PCI. The CPICH is a downlink channel broadcast by the base station 101 with constant power and of a known bit sequence.

For two antennas, the CQI is computed as follows:

$$CQI = \begin{cases} 15 \times CQI_1 + CQI_2 + 31 & \text{when 2 transport blocks are preferred by the user equipment} \\ CQI_S & \text{when 1 transport block is preferred by the user equipment} \end{cases}$$

Where the CQI is the channel quality per individual layer. $CQI_1$ is the CQI of the first codeword, $CQI_2$ is the CQI for the second codeword and $CQI_S$ is the CQI for rank 1 transmission. The number 31 is used in the equation so that 32-256 can be used for a rank 2 transmission.

It may be observed from the equation above that if the CQI is less than 31, the rank information is 1, otherwise the rank information is 2. The PCI is the precoding information bits selected in the subset of the codebook corresponding to the rank information.

Step 102

The information computed in step 101, i.e. the CQI and PCI, along with a HARQ ACK/NACK is reported to the base station 101 using e.g. the PDCCH or the HS-DPCCH.

The periodicity of HS-DPCCH is one sub-frame (e.g. 2 msec). The structure of the HS-DPCCH is shown in FIG. 2a and FIG. 2b. FIG. 2a shows an example of how the PCI and the CQI are located in the structure. As well-known, the HS-DPCCH sub-frame structure comprises one slot for HARQ ACK/NACK transmissions and two slots for CQI and PCI transmissions. In the following, even though the text or the drawings may refer to a HARQ ACK, it is appreciated that this may also be a HARQ NACK.

The HS-DPCCH sub-frame structure in FIG. 2a for the TTI=2 ms comprises a field comprising a HARQ ACK or NACK. The HARQ ACK/NACK notifies the base station 101 whether or not the user equipment 105 has received the correct downlink data. The HARQ ACK/NACK field may be defined like this: 1=NACK, 0=ACK. The CQI reflects the PCI based on CPICH strength. The each sub-frame comprises a HARQ ACK/NACK, two CQI fields and one PCI field. In other words, every sub-frame comprises the same fields.

The HS-DPCCH in 3GPP release 5 to release 9 is based on a 1×SF256 solution, where SF is short for spreading factor. The structure of the HS-DPCCH is shown in FIG. 2b. As well-known, the HS-DPCCH sub-frame structure comprises one slot for HARQ ACK/NACK transmissions and two slots for CQI and PCI transmissions. This structure may also be used for four branch MIMO.

HARQ Details: For 3GPP release 7 MIMO, the HARQ ACK/NACK codebook comprises six codewords.

CQI and PCI Details: In 3GPP release 7 there are 5 or 2×4 bits allocated for describing the CQI depending on the CQI type. There are 30 or 15 CQI values per data stream for rank 1 and rank 2, respectively, and rank is implicitly signalled via the CQI. Furthermore, the CQIs for each data stream are signalled independently of each other. In addition to CQI bits, there are two bits allocated for signalling the preferred precoding information. The 7 (or 10) information bits are then encoded into 20 channel bits that are transmitted during the second and third slot.

Returning to FIG. 1.

Step 103

Once the base station 101 receives the whole CSI report, i.e. CQI, PCI and HARQ ACK/NACK, it allocates the required channelization codes, modulation and coding, precoding control indicator to the user equipment 105 after scheduling.

Step 104

Information about the required channelization codes, modulation and coding, precoding control indicator from step 103 is transmitted to the user equipment 105 using the HS-SCCH.

Step 105

When the user equipment 105 has received the information in step 105, the user equipment 105 detects the HS-SCCH.

Step 106

Once the user equipment 105 has detected the HS-SCCH, the downlink transmission starts through a data traffic channel using the HS-PDSCH.

In general, HS-DPCCH design depends on many factors like number of codewords supported, number of HARQ processes, precoding codebook etc. Four branch MIMO should support two codewords and two HARQ processes.

The current HSDPA system (3GPP releases 7-10) supports one or two transmit antennas at the base station 101. For these systems, from channel sounding, the user equipment 105 measures the channel and reports the channel state information in one sub-frame. A sub-frame may be defined as for example one Transmission Time Interval (TTI) which may be e.g. 1 ms or 2 ms. Typically this channel state information report comprises the CQI which explicitly indicates the RI and the PCI. The user equipment sends this report periodically for every sub-frame, i.e. for every TTI to the base station. Once the base station receives this report it grants the Modulation and Coding Scheme (MCS), number of codes, rank and the PCI to each specific user equipment based on a scheduler metric. Based on this information, the base station may optimize the downlink throughput for each TTI.

The introduction of four branch MIMO will require a new feedback channel structure to send the CQI and PCI information to the base station. Since a two codeword four branch MIMO may be used, the same HS-DPCCH structure may be used for four branch MIMO as used for two branch MIMO. A problem is how to report the RI and the PCI by using the same HS-DPCCH structure as of today since the four branch MIMO requires more bits to report the RI and the PCI.

SUMMARY

An object of the embodiments herein is therefore to obviate at least one of the above disadvantages and to provide improved scheduling of user equipments in a wireless communications system.

According to a first aspect, the object is achieved by a method in a base station for scheduling a user equipment in a communication system. The base station receives a part of the CSI from the user equipment in a TTI. The CSI comprises at least one of a CQI, a RI, a PCI and a HARQ ACK/NACK. The base station determines a type of data stream in which the part of the CSI was received in the TTI. The base station determines whether the type of data stream is equal to a predetermined type. When the type of data stream is equal to the predetermined type, the base station schedules the user equipment with a first transmission type. The base station schedules the user equipment with a second transmission type when the type of data stream is different from the predetermined type.

According to a second aspect, the object is achieved by a method in the user equipment for enabling the base station to schedule the user equipment in the communication system. The user equipment determines the CSI based on information about a CPICH. The CSI comprises a CQI, a RI, a PCI and a HARQ ACK/NACK. The user equipment transmits a part of the CSI in a TTI to the base station, thereby enabling the base station to schedule the user equipment.

According to a third aspect, the object is achieved by a base station for scheduling a user equipment in a communication system. The base station comprises a receiver configured to receive a part of the CSI from the user equipment in a TTI. The CSI comprises at least one of a CQI, a RI, a PCI and a HARQ ACK/NACK. The base station comprises a processor which is configured to determine a type of data stream in which the part of the CSI was received in the TTI, and to determine whether the type of data stream is equal to a predetermined type. The base station comprises a scheduler which is configured to schedule the user equipment with a first transmission type when the type of data stream is equal to the predetermined type. The scheduler is further configured to schedule the user equipment with a second transmission type when the type of data stream is different from the predetermined type.

According to a fourth aspect, the object is achieved by a user equipment for enabling a base station to schedule the user equipment in a communication system. The user equipment comprises a processor which is configured to determine the CSI, based on information about a CPICH. The CSI comprises CQI, a RI, a PCI, and a HARQ ACK/NACK. The user equipment comprises a transmitter which is configured to transmit a part of the CSI in a TTI to the base station, thereby enabling the base station to schedule the user equipment.

Since the base station may start scheduling the user equipment after it has received a part of the CSI in a first TTI it does not have to wait until it has received the complete channel information in order to schedule the user equipment, which improves the scheduling of user equipment in the wireless communications system.

Embodiments herein afford many advantages, of which a non-exhaustive list of examples follows:

The embodiments herein have an advantage of improving the downlink spectral efficiency and increasing the average spectral efficiency.

Another advantage of the embodiments herein is that it enhances the spatial multiplexing gains and improves beam forming capabilities The embodiments herein provide an advantage of that it requires minimal standard changes as it may be used for four branch MIMO feedback channel design.

The user equipment may be scheduled after the first CSI report has been received rather than waiting for the complete channel state information in two reporting intervals, thereby reducing the potential delay of one sub-frame delay. This gives an advantage of significant improvement for delay sensitive data applications.

An advantage of the embodiments herein is that existing functionality is re-used as far as possible.

Another advantage is that four branch MIMO is used in combination with downlink multi-carrier operation over 1-4 carriers.

Another advantage is that it is possible to operate four branch MIMO in combination with a single uplink carrier if applied with downlink multi-carrier operation.

On advantage of the embodiments herein is that they provide a well-performing solution while at the same time trying to re-use existing solutions, e.g. multicarrier, when designing HS-DPCCH for 4×4 DL MIMO. One example is that it would be beneficial to re-use available codebooks if possible. DL is short for DownLink.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 1 is a signalling diagram illustrating embodiments of a method.

FIG. 5 is a schematic block diagrams illustrating embodiments of a HS-DPCCH structure for a rank 1 transmission.

FIG. 6 is a schematic block diagrams illustrating embodiments of a HS-DPCCH structure for a rank 2 transmission.

FIG. 7 is a schematic block diagrams illustrating embodiments of a HS-DPCCH structure for a rank 3 transmission.

FIG. 8a is a schematic block diagrams illustrating embodiments of a HS-DPCCH structure for a rank 4 transmission.

FIG. 8b is a schematic block diagrams illustrating embodiments of a HS-DPCCH structure without time multiplexing.

FIG. 14 is a graph illustrating link performance for rank 4 only transmissions.

FIG. 15 is a graph illustrating link performance for rank 3 only transmissions.

FIG. 16 is a graph illustrating link performance for rank 2 only transmissions.

FIG. 17 is a graph illustrating link performance for rank 1 only transmissions.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to scheduling user equipments without waiting for the complete CSI to arrive at the base station. Based on the CSI reporting, the base station schedules the transport blocks, modulation and coding scheme, precoding control indicator associated with the user equipment. Ideally, two reporting intervals are needed to schedule the user equipment as only after two reporting intervals, it gets the complete channel information. In the embodiments herein, a scheduling algorithm at the base station is outlined with a partial CSI report. In other words, instead of waiting for the complete CSI from the user equipment, the base station starts scheduling the user equipment once it gets the first CSI report. For scheduling, it may choose a random PCI within the subset indicated by PCI Most Significant Bit (PCI MSB) which is received in the first CSI report. This does not impact the communication system because the impact due to a PCI error is very minimal. The embodiments herein are applicable to an n-way transmit antenna system, where n is a positive integer larger than 1.

As mentioned above two codewords is used for four branch MIMO, and therefore the release 7 HARQ ACK/NACK codebook should be re-used. In other words, MIMO ACK/NACK reuses the existing HARQ ACK/NACK codebook of 3GPP release 7 for a single carrier.

Multi-Carrier Extension

Re-using the multi-carrier evolution steps makes it straightforward to extend the HARQ ACK/NACK signalling for 4×4 DL MIMO with multiple carriers. For two carriers, the SF256 structure is kept and some of the 3GPP release 9 codewords are re-used to jointly code ACK/NACK for two carriers. Similar to multi-carrier it is necessary to include cases where one carrier is DTXed. For three to four carriers it is natural to re-use the 3GPP release 10 multi-carrier operation with a SF128 structure (grouping carriers two and two) and introducing the DTX codeword. DTX is short for Discontinuous Transmission.

Figure 2A:
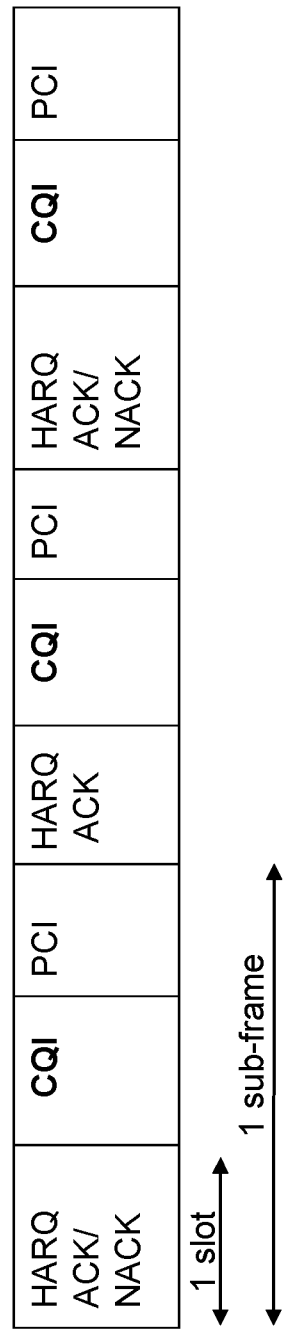
FIG. 2a-b are schematic block diagrams illustrating embodiments of a HS-DPCCH structure.
Figure 2B:
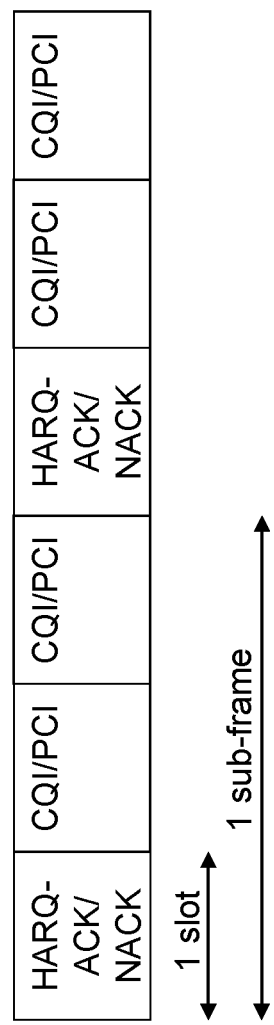
Figure 3:
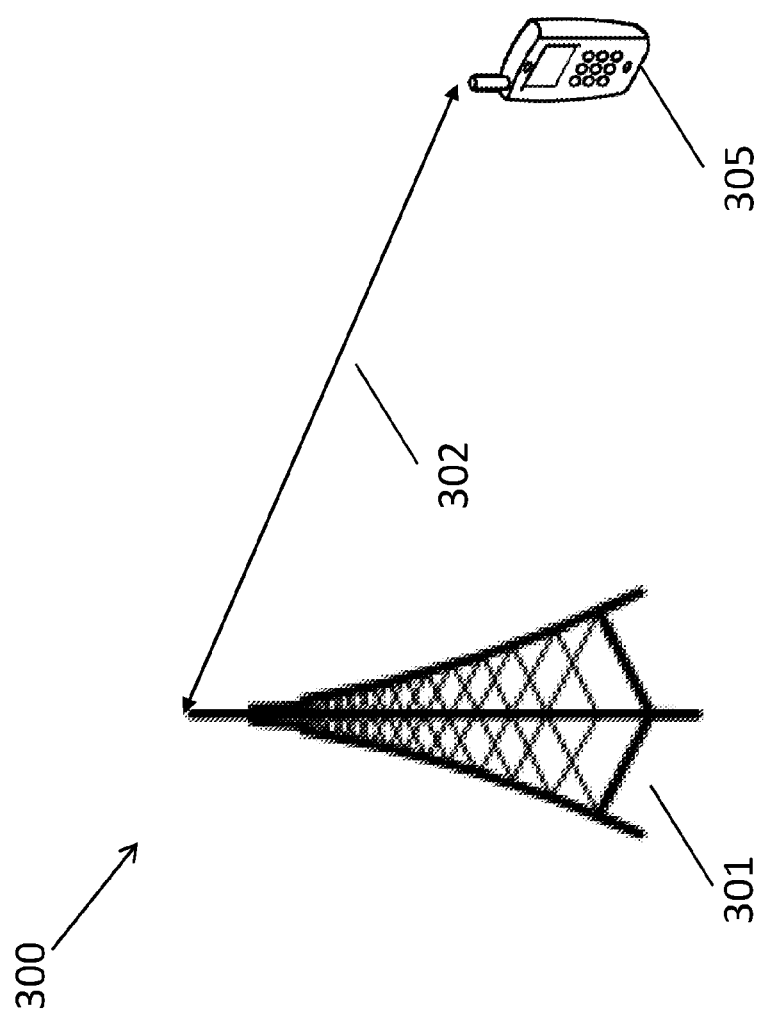
FIG. 3 is a schematic block diagram illustrating embodiments of a communications system.

FIG. 3 depicts a communications system 300 in which embodiments herein may be implemented. The communications system 300 may in some embodiments apply to one or more radio access technologies such as for example LTE, LTE Advanced, Wideband Code Division Multiple Access (WCDMA), HSPA, Global System for Mobile Communications (GSM), or any other 3GPP radio access technology or other radio access technologies such as Wireless Local Area Network (WLAN). The communications system 300 is a multi-transmit antenna system, such as e.g. a four-way transmit antenna system, an eight-way transmit antenna system, a sixteen-way transmit antenna system etc.

The communications system 300 comprises at least one base station 301 serving a cell. The base station 301 may be a base station such as a NodeB, an eNodeB, a pico node, a WLAN wireless access point/router or any other network unit capable to communicate over a radio carrier 302 with a user equipment 305 being present in the cell.

The user equipment 305 may be any device, mobile or stationary, enabled to communicate over the radio carrier 302 in the communications system 300, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The user equipment 305 is referred to as UE in some of the figures.

As mentioned above, the communications system 300 is an n-way transmit antenna communication system. For example, in a four way system, all four antennas may be comprised in the base station 301. In another example of a four way system, two antennas are comprised in the base station 301 and the other two antennas are comprised in another base station (not shown in FIG. 3). So the n transmit antennas may be located at different locations, i.e. different base stations.

Figure 4:
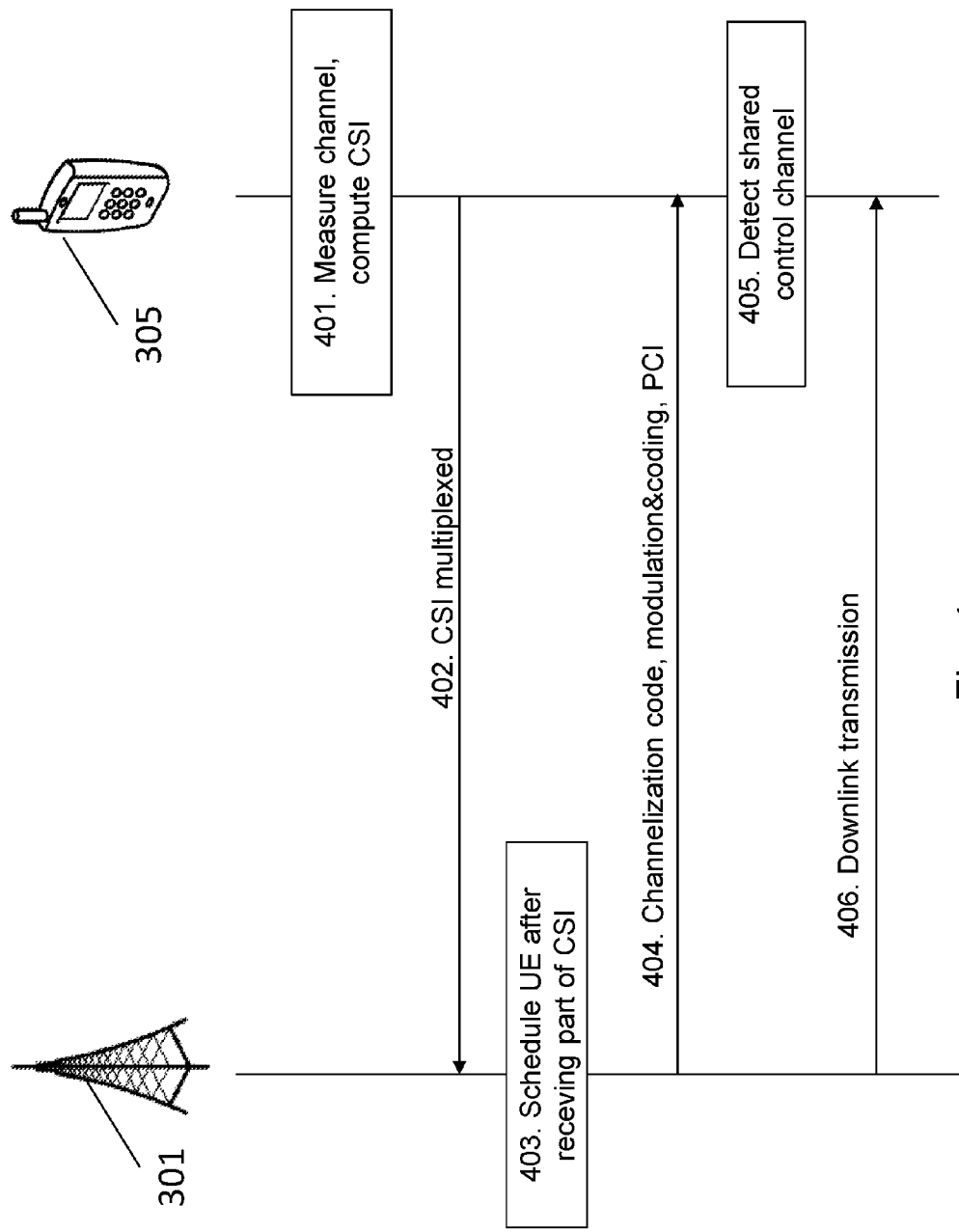
FIG. 4 is a signalling diagram illustrating embodiments of a method.

CQI for four branch MIMO with two codewords will now be described. Even though the following text uses four branch MIMO as an example, it is also valid for any other type of MIMO, such as e.g. 8×8 and 16×16. The method for enabling a base station 301 to schedule the user equipment 305 in a communication system 300 which is a four way transmit antenna system according to some embodiments will now be described with reference to the combined signalling diagram and flowchart depicted in FIG. 4. The method comprises the following steps, which steps may as well be carried out in another suitable order than described below:

Step 401

From the CPICH, the user equipment 305 estimates or measures the radio carrier 302 and computes the CSI which may comprise at least one of the CQI, the RI and the PCI. The CPICH is a downlink channel broadcast by the base station 301 with constant power and of a known bit sequence. The CPICH may be a Demodulation-CPICH (D-CPICH) or any other suitable type of CPICH as understood by the skilled person. Radio Resource Control (RRC) signalling indicates how often the user equipment 305 should report the CSI at the time of cell setup.

For two antennas, the CQI may be computed as follows:

$$CQI = \begin{cases} 15 \times CQI_1 + CQI_2 + 31 & \text{when 2 transport blocks are preferred by the } UE \\ CQI_S & \text{when 1 transport block is preferred by the } UE \end{cases}$$

Where the CQI is the channel quality per individual layer. $CQI_1$ is the CQI of the first codeword, $CQI_2$ is the CQI for the second codeword and $CQI_S$ is the CQI for rank 1 transmission. The number 31 is used in the equation so that 32-256 can be used for a rank 2 transmission.

The user equipment 305 may store the CSI in a memory 1305.

Step 402

For the four branch MIMO with two HARQ process, the user equipment 305 informs the base station 301 about the CSI. The CSI is transmitted in parts to the base station, e.g. a first part and a second part. The CSI may be transmitted periodically and through the feedback channel, e.g. an uplink signalling channel such as the HS-DPCCH. The CSI comprises at least one of the following parameters:

HARQ ACK/NACK information—The same structure as that of 3GPP release 7.

CQI per codeword—Since two codewords are defined in the standard, two codewords are needed (5 bits each). For two HARQ processes, two CQIs are needed, the same as that of 3GPP release 7. The CQI tables of 3GPP release 7 may be reused. For two HARQ processes, two CQI same as that of 3GPP release 7 is necessary. Hence, in total 8 bits are necessary for the two CQIs. It is possible to reuse the CQI tables of 3GPP release 7.

RI—Indicates the number of layers the user equipment 305 is preferring (2 bits). Since up to four data streams are possible, it is recommended to use two dedicated bits for indicating rank information if the parameter RI is conveyed explicitly.

PCI—Precoding Control Indicator in the RI (4 bits). This is because it has been decided to use a LTE release 8 precoder. Hence, 4 bits are used to indicate the precoding weights per each rank.

If the structure is compared with 3GPP release 7 MIMO, it is necessary to add additional bits for reporting the PCI and the RI. Hence in total 4+4+2+4=14 bits should fit in the legacy structure with 10 bits. In the following, two design options to incorporate these extra bits will be described with reference to FIGS. 5, 6, 7, 8a and 8b. The above parameters are multiplexed in a plurality of TTIs. The two options may be:

Option 1: Time multiplexed PCI, Implicit RI (FIGS. 5, 6, 7, 8a).

Option 2: CQI/RI/PCI in one sub-frame (FIG. 8b).

In FIGS. 5, 6, 7, 8a and 8b, it should be observed that the rank information preferred by the user equipment 305 is indicated in the first two reporting intervals and the PCI bits are time multiplexed in two reporting intervals. PCI MSB indicates the most significant bits of PCI and PCI Least Significant Bit (PCI LSB) indicates least significant bits of PCI. The main idea behind this structure is that the rank information, which is a second order statics of the radio carrier 302 changes slowly and delayed information of RI/PCI does not impact the link level performance. Note that CQI-Single data stream (CQI-S) corresponds to the CQI value less than 31 and CQI-Dual data stream (CQI-D) corresponds to a value greater than 31 and less than 255 as in 3GPP release 7 MIMO.

Observe that for rank 1 transmissions, only one CQI is needed, hence the CQI reported during the second reporting interval is redundant. Similarly for rank 2 transmissions, the CQI reported during the second reporting interval is of a single data stream, preferably the primary data stream. It is not possible to convey information for a dual data stream in the second reporting interval. This is because the same structure is used for rank 4 transmissions. Also note that for rank 3 transmissions, the structure is similar to rank 1 transmissions for the first reporting interval. As mentioned above, the transmission rank refers to the number of transmitted data streams.

One salient advantage with this method is that even though base station 301 gets the complete channel state information after two reporting intervals, it may start scheduling the user equipment 305 once it receives the PCI MSB at the end of first reporting interval. Another advantage of this method is it does not require any standards change and the existing HS-DPCCH structure as that of 3GPP release 7 MIMO may be reused.

FIG. 5 illustrates option 1 and is an example of the HS-DPCCH structure for a rank 1 transmission with time multiplexed PCI. Note that the rank information is conveyed explicitly. The structure is also relevant for e.g., DPCCH. The first TTI, which also may be referred to as a first reporting interval or a first CSI report, comprises the HARQ ACK/NACK, the CQI-S and the PCI MSB. The PCI MSB indicates the most significant bits of the PCI. The second TTI, also referred to as a second reporting interval or second CSI report, comprises the HARQ ACK/NACK, CQI-S and the PCI LSB. The PCI LSB indicates the least significant bits of PCI. Thus, the PCI is time multiplexed over two TTIs, but is still interpreted as a joint PCI. Note that CQI-S refers to the single data stream and corresponds to the CQI value less than 31. The third TTI, also referred to as a third reporting interval or third CSI report, comprises the HARQ ACK/NACK, the CQI-S and the PCI MSB.

FIG. 6 illustrates option 1 and is an example of the HS-DPCCH structure for a rank 2 transmission. The structure is also relevant for e.g. DPCCH. The first TTI comprises the HARQ ACK/NACK, the CQI-D and the PCI MBS. The PCI MSB indicates the most significant bits of the PCI. The CQI-D indicates the dual data stream, and corresponds to the CQI value greater than 31. The second TTI comprises the HARQ ACK/NACK, CQI-S and the PCI LSB. The PCI LSB indicates the least significant bits of PCI. Thus, the PCI is time multiplexed over two TTIs, but is still interpreted as a joint PCI. Note that CQI-S refers to the single data stream and corresponds to the CQI value less than 31. The third TTI, also referred to as a third reporting interval or third CSI report, comprises the HARQ ACK/NACK, the CQI-S and the PCI MSB.

FIG. 7 illustrates option 1 and is an example of the HS-DPCCH structure for a rank 3 transmission. The structure is also relevant for e.g., DPCCH. The first TTI comprises the HARQ ACK/NACK, the CQI-S and the PCI MSB. The PCI MSB indicates the most significant bits of the PCI. The CQI-S indicates the single data stream, and corresponds to the CQI value less than 31. The second TTI comprises the HARQ ACK/NACK, CQI-D and the PCI LSB. The PCI LSB indicates the least significant bits of PCI. Thus, the PCI is time multiplexed over two TTIs, but is still interpreted as a joint PCI. Note that CQI-D refers to the dual data stream and corresponds to the CQI value greater than 31. The third TTI, also referred to as a third reporting interval or third CSI report, comprises the HARQ ACK/NACK, the CQI-S and the PCI MSB.

FIG. 8a illustrates option 1 and is an example of the HS-DPCCH structure for a rank 4 transmission. The structure is also relevant for e.g., DPCCH. The first TTI comprises the HARQ ACK/NACK, the CQI-D and the PCI MSB. The PCI MSB indicates the most significant bits of the PCI. The CQI-D indicates the single dual data stream, and corresponds to the CQI value greater than 31. The second TTI comprises the HARQ ACK/NACK, CQI-D and the PCI LSB. The PCI LSB indicates the lease significant bits of PCI. Thus, the PCI is time multiplexed over two TTIs, but is still interpreted as a joint PCI. The third TTI, also referred to as a third reporting interval or third CSI report, comprises the HARQ ACK/NACK, the CQI-S and the PCI MSB. Note that CQI-S refers to the single data stream and corresponds to the CQI value less than 31.

FIG. 8b illustrates option 2 and shows a HS-DPCCH structure for without time multiplexing. The structure is also relevant for e.g. DPCCH. Both the CQI, the RI and the PCI bits are transmitted in one reporting interval, i.e. one TTI. Observe that in this case, it is necessary to change the SF or the encoder as all the bits does not fit into the existing structure of HS-DPCCH (14 bits).

Returning to FIG. 4.

Step 403

Once the base station 301 has received the partial CSI information in the first TTI, the base station 301 starts to schedule the user equipment 305, i.e. it schedules the transport blocks, modulation and coding scheme, precoding control indicator for the user equipment 305. As mentioned above, ideally, the base station 301 needs two TTIs to schedule the user equipment 305 as only after two TTIs, it gets the complete channel state information. Instead of waiting to get the complete CSI from the user equipment 305, the base station 301 starts scheduling the user equipment 305 after receiving the first TTI. In the first TTI, the base station 301 has only received a part of the PCI, i.e. the PCI MSB, but it will choose a random PCI LSB within the subset indicated by RI. The random chosen PCI LSB may not be exactly the same as the original PCI LSB, which will be received in the second TTI. However, the impact due to a PCI error is minimal. An explanation of how the base station 301 will perform the scheduling will follow below, with reference to FIG. 9.

Step 404

The information about the transport blocks, modulation and coding scheme, PCI from step 403 is transmitted from the base station 301 to the user equipment 305 using a shared control channel, such as e.g. the HS-SCCH.

Step 405

The user equipment 305 detects the shared control channel, e.g. the HS-SCCH and the information transmitted in step 404.

Step 406

Once the user equipment 305 has detected the shared control channel, the downlink transmission from the base station 301 starts through the data traffic channel using a PDSCH, e.g. the HS-PDSCH. The base station 301 knows that it can start the downlink transmission as long as there is data intended for that user equipment 305.

Note that although the description above assumes that the four branch MIMO is applied to a single downlink carrier it is straightforward to extend the embodiments to scenarios such as for example where a four branch MIMO is used in combination with multi-carrier HSDPA operation. Furthermore, even though High Speed (HS) channels are used as an example above, the description is also applicable to other channels.

Figure 9:
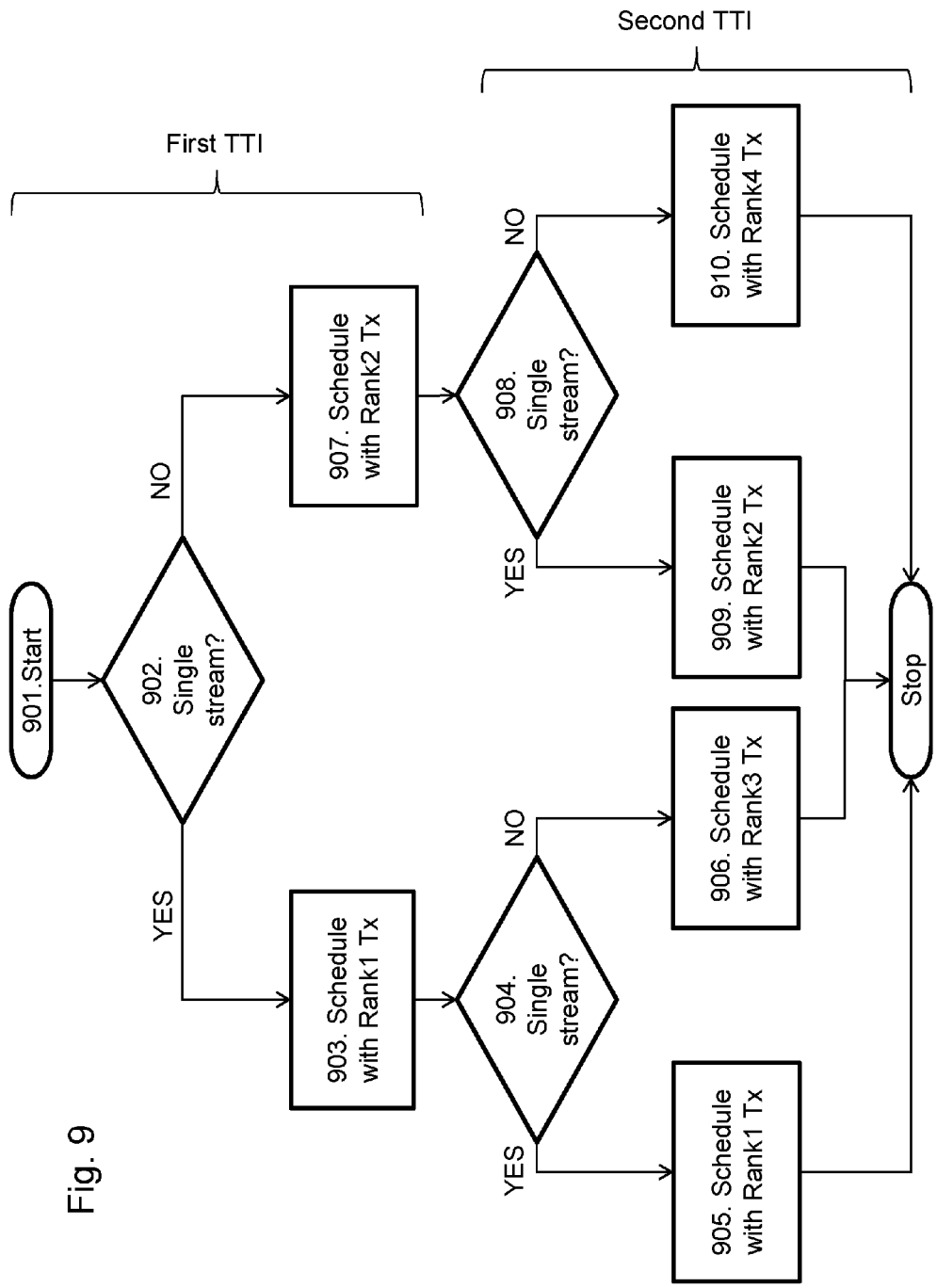
FIG. 9 is a flow chart illustrating embodiments of a method in a base station.

FIG. 9 is a flow chart illustrating a method performed in the base station 301 for scheduling the user equipment 305 in a n-way communication system, where n is a positive integer larger than 1. Note that the flow chart is shown for two reporting intervals, i.e. TTIs. The CSI is multiplexed in the two TTIs. The CSI comprises a first part and a second part in this example. The skilled in the art will understand how to apply the procedure for the remaining reporting intervals. The method comprises the following steps, which steps may be performed in any suitable order:

Step 901

The base station 301 starts the procedure upon receipt of the first part of the CSI in the first TTI from the user equipment 305.

First, the left side of the flow chart will be described.

Before the user equipment 305 sends the first part of the CSI in the first TTI to the base station 301 it may store the whole CSI, i.e. the first and second part of the CSI, for example in a memory 1305.

Step 902

The base station 301 checks whether the first part of the CSI information in the first TTI was received using a single data stream, i.e. CQI-S. If yes, the method proceeds to step 903. If no, the method proceeds to step 907.

Step 903

If the first part of the CSI in the first TTI was received using a single data stream, indicated with yes in FIG. 9, the base station 301 schedules the user equipment 305 with a rank 1 transmission, i.e. one transmitted data stream.

Step 904

After the base station 301 has received first part of the CSI in the first TTI, it receives the 35 second part of the CSI in the second TTI from the user equipment 305 and then performs step 904. The base station 301 determines whether the second part of the CSI in the second TTI was received using a single data stream, i.e. CQI-S. If yes, the method proceeds to step 905. If no, the method proceeds to step 906.

In some embodiments, the second part of the CSI in the second TTI may be the CSI which the user equipment 305 has stored. In some embodiments, the user equipment will update its CSI before sending the second part of the CSI in the second TTI to the base station 301. Thus, the CSI which the base station 301 receives in the second TTI is the updated CSI.

Step 905

If the second part of the CSI in the second TTI was received using a single data stream, indicated with yes in FIG. 9, the base station 301 schedules the user equipment 305 with a rank 1 transmission, i.e. one transmitted data stream.

Step 906

If the second part of the CSI in the second TTI was received not using a single data stream, indicated with no in FIG. 9, the base station 301 schedules the user equipment 305 with a rank 3 transmission, i.e. three transmitted data streams.

Now, the right side of the flow chart in FIG. 9 will be described.

Step 907

If the first part of the CSI in the first TTI was not received using a single data stream, indicated with no in FIG. 9 (step 902), the base station 301 schedules the user equipment 305 with a rank 2 transmission, i.e. two transmitted data streams.

Step 908

After the base station 301 has received the second part of the CSI in the second TTI, the method performs step 908. The base station determines whether the second part of the CSI in the second TTI was received using a single data stream. If yes, the method proceeds to step 909. If no, the method proceeds to step 910.

Step 909

This step is performed if the second part of the CSI in the second TTI was received using a single data stream, indicated with yes in FIG. 9. The base station 301 then schedules the user equipment 305 with a rank 2 transmission, i.e. two transmitted data streams.

Step 910

This step is performed if the second part of the CSI in the second TTI was received not using a single data stream, indicated with no in FIG. 9. The base station 301 then schedules the user equipment 305 with a rank 4 transmission, i.e. four transmitted data streams.

Figure 10:
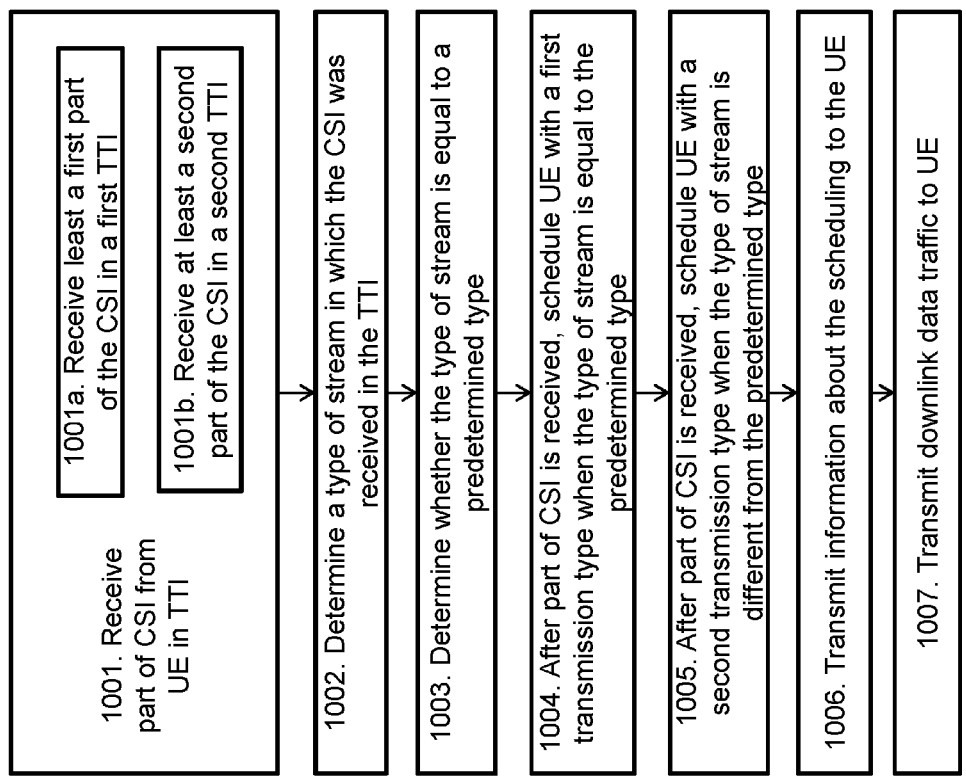
FIG. 10 is a flow chart illustrating embodiments of a method in a base station.

The method described above will now be described seen from the perspective of the base station 301. FIG. 10 is a flowchart describing the present method in the base station 301 for scheduling the user equipment 305 in the communication system 300. The base station 301 is connected to and serving the user equipment 305 via a radio carrier 302. The radio carrier 302 may be a single downlink carrier or a multi-carrier. The communication system 300 may be an n-way transmit antenna system, wherein n is a positive integer larger than one. The method comprises the following steps to be performed by the base station 301, which steps may be performed in any suitable order than described below:

Step 1001

The base station 301 receives a part of the CSI from the user equipment 305 in a TTI. The CSI comprises at least one of a CQI, a RI, a PCI, and a HARQ ACK/NACK. The TTI may be a first TTI, or the TTI may be a second TTI or higher TTI. In some embodiments, the CSI is received from the user equipment 305 using a HS-DPCCH. The part of the CSI may be a first part received in a first TTI or a second part received in a second TTI.

Step 1002

This step corresponds to step 902, 904 and 908 in FIG. 9. The base station 301 determines a type of data stream in which the part of the CSI was received in the TTI. The predetermined type may be a single data stream.

Step 1003

This step corresponds to step 902, 904 and 908 in FIG. 9. The base station 301 determines whether the type of data stream is equal to a predetermined type. For example, the predetermined type may be a single data stream.

Step 1004

This step corresponds to step 903, 905 and 909 in FIG. 9. After the base station has received the part of the CSI, the base station 301 schedules the user equipment 305 with a first transmission type when the type of data stream is equal to the predetermined type. The first transmission type may be a rank one transmission or a rank two transmission.

Step 1005

This step corresponds to step 906, 907 and 910 in FIG. 9. After the base station has received the part of the CSI, the base station 301 schedules the user equipment 305 with a second transmission type when the type of data stream is different from the predetermined type. The second transmission type may be a rank two transmission or a rank three transmission or a rank four transmission.

Step 1006

In some embodiments, the base station 301 transmits information about the scheduling to the user equipment 305, for example using a HS-SCCH.

Step 1007

In some embodiments, the base station 301 transmits downlink data traffic to the user equipment 305, for example using a HS-PDSCH.

Figure 11:
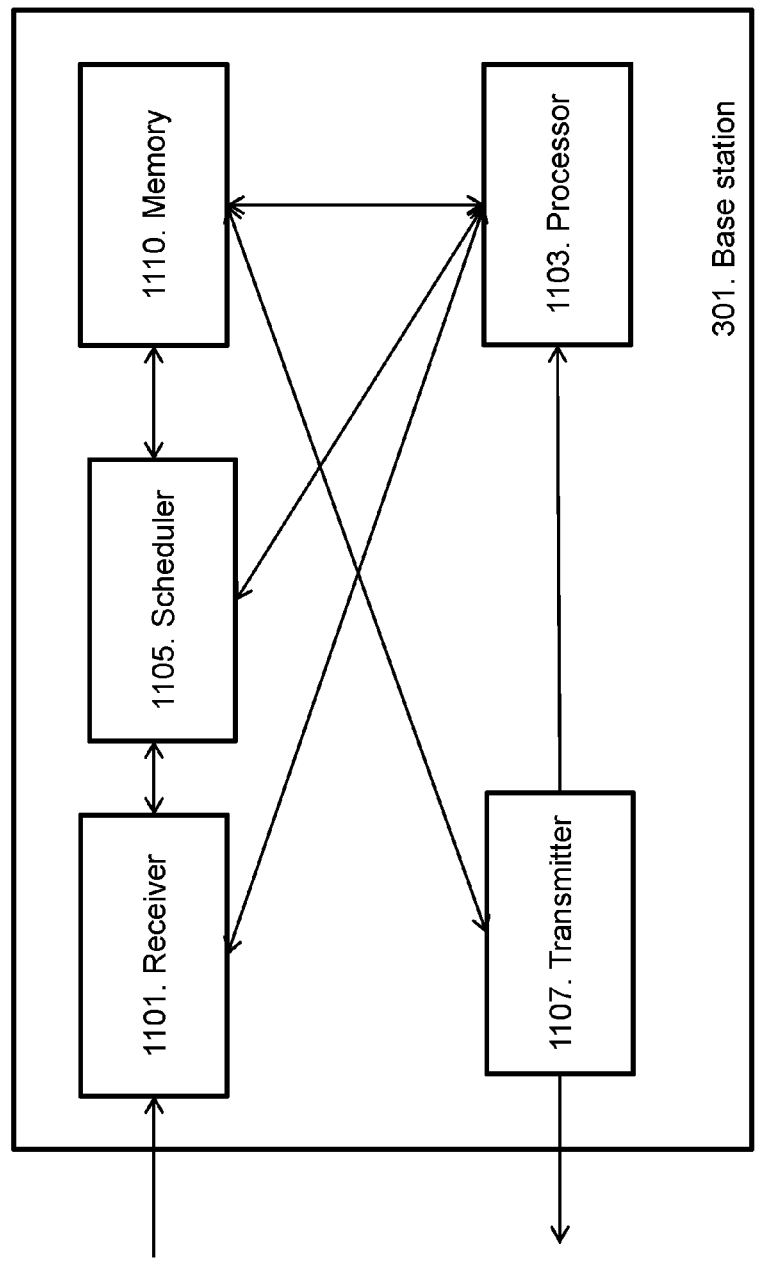
FIG. 11 is a schematic block diagram illustrating embodiments of a base station.

To perform the method steps shown in FIG. 10 for scheduling a user equipment 305 in the communication system 300, the base station 301 comprises an arrangement as shown in FIG. 11. The base station 301 is configured to be connected to and serving the user equipment 305 via a radio carrier 302. The radio carrier 302 may be a single downlink carrier or a multi-carrier. The communication system 300 may be an n-way transmit antenna system, wherein n is a positive integer larger than one.

The base station 301 comprises a receiver 1101 configured to receive a part of the CSI from the user equipment 305 in a TTI. The CSI comprises at least one of a CQI, a RI, a PCI, and a HARQ ACK/NACK. The part of the CSI may be received from the user equipment 305 using a HS-DPCCH. The part of the CSI may be a first part received in a first TTI or a second part received in a second TTI. I.e. the CSI comprises two parts; the first part and the second part. The receiver 1101 may be further configured to receive a first part of the CSI in a first TTI, and to receive a second part of the CSI in a second TTI. Thus, the complete CSI may be multiplexed in a plurality of TTIs.

The base station 301 comprises a processor 1103 configured to determine a type of data stream in which the part of the CSI was received in the TTI, and to determine whether the type of data stream is equal to a predetermined type. The predetermined type may be a single data stream. The TTI may be a first TTI, or a second TTI or higher TTI. The processor 1103 may comprise Radio Frequency (RF) circuitry and baseband processing circuitry (not shown).

The base station 301 comprises a scheduler 1105 which is configured to schedule the user equipment 305 with a first transmission type when the type of data stream is equal to the predetermined type and after the base station 301 has received the part of the CSI, and to schedule the user equipment 305 with a second transmission type when the type of data stream is different from the predetermined type and after the base station 301 has received the part of the CSI. The first transmission type may be a rank one transmission or a rank two transmission. The second transmission type may be a rank two transmission or a rank three transmission or a rank four transmission.

In some embodiments, the base station 301 comprises a transmitter 1107 configured to transmit information about the scheduling to the user equipment 305, for example using a HS-SCCH, and to transmit downlink data traffic to the user equipment 305 using for example a HS-PDSCH.

The base station 301 may further comprise a memory 1110 comprising one or more memory units. The memory 1110 is arranged to be used to store data, received data streams, CSI, types of data streams, the predetermined type of data stream, the first and second transmission types, threshold values, time periods, configurations, schedulings, and applications to perform the methods herein when being executed in the base station 301.

Those skilled in the art will also appreciate that the receiver 1101, the scheduler 1105 and the transmitter 1107 described above may refer to a combination of analog and digital circuits, and/or one or more processors configured with software and/or firmware, e.g. stored in the memory 1110, that when executed by the one or more processors such as the processor 1103 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 12:
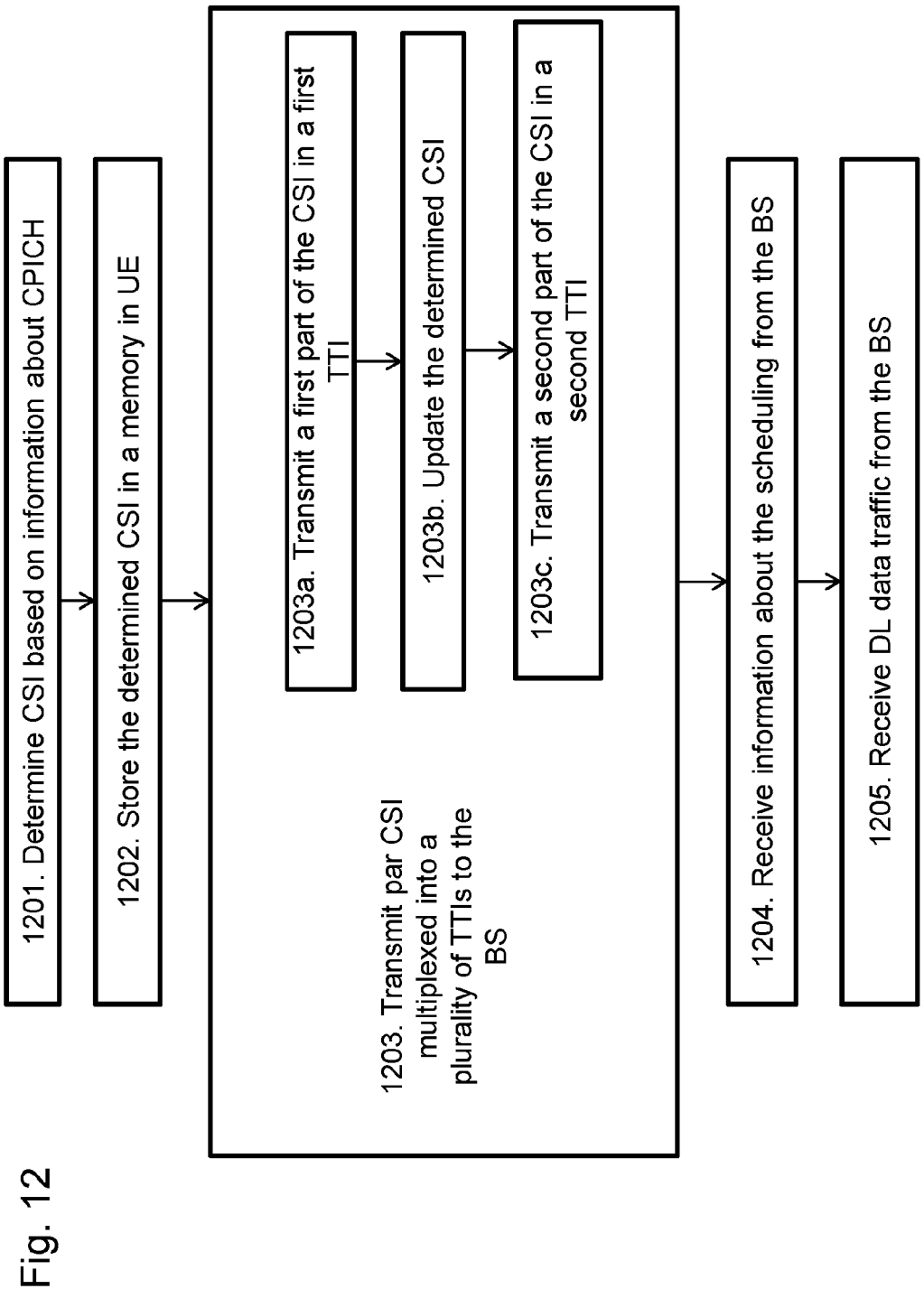
FIG. 12 is a flow chart illustrating embodiments of a method in a user equipment.

The method described above will now be described seen from the perspective of the user equipment 305. FIG. 12 is a flowchart describing the present method in the user equipment 305 for enabling a base station 301 to schedule the user equipment 305 in a communication system 300. The user equipment is connected to and served by the base station 301 via a radio carrier 302. The communication system 300 may be an n-way transmit antenna system, wherein n is a positive integer larger than one. The method comprises the following steps to be performed by the user equipment 305:

Step 1201

The user equipment 305 determines CSI based on information about a CPICH. The CSI comprises CQI, a RI, a PCI, and a HARQ ACK/NACK.

Step 1202

In some embodiments, the user equipment 305 stores the determined CSI, for example in a memory 1305 comprised in the user equipment 305.

Step 1203

The user equipment 305 transmits a part of the CSI in a TTI to the base station 301, thereby enabling the base station 301 to schedule the user equipment 305.

The part of the CSI transmitted to the base station 301 may be the stored CSI.

The part of the CSI may be a first part in a first TTI or a second part in a second TTI. Thus, the complete CSI comprises two parts: the first part and the second part. The complete CSI is multiplexed in a plurality of TTIs.

Step 1203a

This is a substep of step 1203. In some embodiments, the user equipment 305 transmits a first part of the CSI in a first TTI to the base station 301.

Step 1203b

This is a substep of step 1203, and a step that may be performed after step 1203a. In some embodiments, the user equipment 305 updates the determined CSI.

Step 1203c

This is a substep of step 1203, and a step to be performed after step 1203a or 1203b. In some embodiments, the user equipment 305 transmits a second part of the CSI in a second TTI to the base station 301. In some embodiments, the second part may be of the updated CSI.

Step 1204

In some embodiments, the user equipment 305 receives information about the scheduling from the base station 301, for example using the HS-SCCH.

Step 1205

In some embodiments, the user equipment 305 receives downlink data traffic from the base station 301, for example using the HS-PDSCH.

Figure 13:
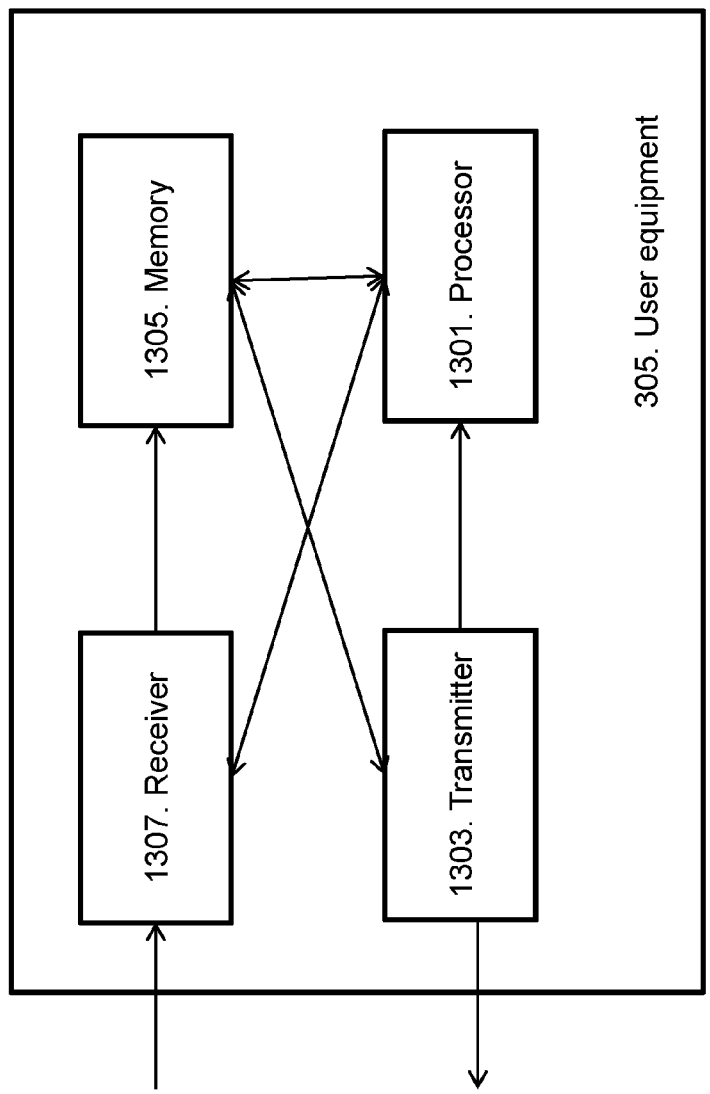
FIG. 13 is a schematic block diagram illustrating embodiments of a user equipment.

To perform the method steps shown in FIG. 11 for enabling a base station 301 to schedule the user equipment 305 in a communication system 300 comprises an arrangement as shown in FIG. 13. As mentioned earlier, the user equipment is configured to be connected to the base station 301 via a radio carrier 302. The communication system 300 may be an n-way transmit antenna system, wherein n is a positive integer larger than one.

The user equipment 305 comprises a processor 1301 which is configured to determine CSI based on information about a CPICH. The CSI comprises at least one of a CQI, a RI, a PCI, and a HARQ ACK/NACK. In some embodiments, the processor 1301 is further configured to update the determined CSI. The processor 1301 may comprise RF circuitry and baseband processing circuitry (not shown).

The user equipment 305 comprises a transmitter 1303 which is configured to transmit a part of the CSI in a TTI to the base station 301, enabling the base station 301 to schedule the user equipment 305. The transmitted part of the CSI may be a first part in a first TTI or a second part in a second TTI. Thus, the complete CSI may comprise two parts: the first part and the second part and the complete CSI is multiplexed in a plurality of TTIs. In some embodiments, the transmitter 1303 is further configured to transmit a first part of the CSI in a first TTI to the base station 301, and to transmit a second part of the CSI in a second TTI to the base station 301. In some embodiments, the CSI is multiplexed into a plurality of TTIs. The CSI transmitted to the base station 301 may be the stored CSI. The second part of the CSI may be of the updated CSI.

The user equipment 305 may further comprise a memory 1305 comprising one or more memory units. The memory 1305 is arranged to be used to store data, received data streams, determined CSI, updated CSI, CPICH, received information about scheduling's, received downlink data traffic, threshold values, time periods, configurations, schedulings, and applications to perform the methods herein when being executed in the user equipment 305.

In some embodiments, the user equipment 305 comprises a receiver 1307 which is configured to receive information about the scheduling from the base station 301 using e.g. the HS-SCCH, and to receive downlink data traffic from the base station 301 using e.g. the HS-PDSCH.

Those skilled in the art will also appreciate that the receiver 1307 and the transmitter 1303 described above may refer to a combination of analog and digital circuits, and/or one or more processors configured with software and/or firmware, e.g. stored in the memory 1305, that when executed by the one or more processors such as the processor 1301 perform as described above. One or more of these processors, as well as the other digital hardware, may be included in a single ASIC, or several processors and various digital hardware may be distributed among several separate components, whether individually packaged or assembled into a SoC.

The present mechanism for scheduling a user equipment 305 in a communication system 300 may be implemented through one or more processors, such as a processor 1103 in the base station arrangement depicted in FIG. 11 and a processor 1301 in the user equipment arrangement depicted in FIG. 13, together with computer program code for performing the functions of the embodiments herein. The processor may be for example a Digital Signal Processor (DSP), ASIC processor, Field-programmable gate array (FPGA) processor or micro processor. The program code mentioned above may also be provided as a computer program product, for instance in the form of a data carrier carrying computer program code for performing the embodiments herein when being loaded into the base station 301 and/or user equipment 305. One such carrier may be in the form of a CD ROM disc. It is however feasible with other data carriers such as a memory stick. The computer program code may furthermore be provided as pure program code on a server and downloaded to the base station 301 and/or user equipment 305.

The link performance of the above option 1 (Time multiplexed PCI, Implicit RI) and option 2 (CQI/RI/PCI in one sub-frame) will now be described. The main objective of these simulations is to quantify the loss if the RI and PCI are time multiplexed rather than transmitting all at a time. The link simulations are carried out with link adaptation, where the rank, PCI, modulation, coding rate and the transport block size are dynamically updated for each TTI. In the simulations perfect channel estimation is assumed and it is assumed that the correlation at both the transmitter and the receiver side is zero. For link adaptation, the user equipment 305 chooses the PCI, RI and MCS based on maximization of a Shannon capacity. Shannon capacity is the tightest upper bound on the amount of information that may be reliably transmitted over a communications channel. The feedback is assumed to have three TTI delays and is assumed to be error free. Simulations are run for a user equipment 305 with different geometry factors and the radio carrier 302 assumed is Pedestrian A channel. The velocity of the mobile is assumed to be 3 Kmph.

FIG. 14 shows the link level performance for two cases where perfect CQI and RI and PCI are transmitted in one reporting interval and the case of time multiplexed reporting over two reporting intervals. Note that the rank is set to four. The x-axis of FIG. 14 represents the geometry in dB and the y-axis of FIG. 14 represents the throughput in Mbps. It may be observed the performance gap between these two is very small. This result validates that impact of delayed RI and PCI very minimal on the link performance. Note that there are two lines illustrated in FIG. 14. The line marked with an x illustrates option 1, i.e. delayed PCI, CQI in two TTIs. The line marked with a circle illustrates option 2, i.e. CQI, PCI, RI in a single TTI.

FIGS. 15, 16, 17 show the same trend for rank 3, 2 and 1 respectively. Hence it is observed that there is no impact if the PCI/RI is time multiplex as in option 1. Note that there are two lines illustrated in each of the FIGS. 15, 16 and 17. The lines marked with an x illustrate option 1, i.e. delayed PCI, CQI in two TTIs. The lines marked with circles illustrate option 2, i.e. CQI, PCI, RI in single TTI. The x-axis of FIGS. 15-17 represents the geometry in dB and the y-axis represents the throughput in Mbps.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods may, without departing from the embodiments herein, be performed in another order than the order in which they appear.

The invention claimed is:

1. A method in a base station for scheduling a user equipment in a communication system, wherein the method comprises:
   receiving a first part of Channel State Information, CSI, from the user equipment in a first Transmission Time Interval, TTI, wherein the first part of the CSI comprises at least one of a Channel Quality Information, CQI, a Rank Indicator, RI, a Precoding Control Indicator, PCI, and a Hybrid Automatic Repeat reQuest ACKnowledgement/Not ACKnowledgement, HARQ ACK/NACK;
   determining a type of data stream in which the first part of the CSI is received;
   determining whether the type of data stream in which the first part of the CSI is received is equal to a predetermined type;
   scheduling the user equipment with a first transmission type when the type of data stream in which the first part of the CSI is received is equal to the predetermined type;
   scheduling the user equipment with a second transmission type when the type of data stream in which the first part of the CSI is received is different from the predetermined type;
   receiving an at least second part of the CSI from the user equipment in an at least second TTI, wherein the at least second part of the CSI comprises at least one of a CQI, a RI, a PCI, and a HARQ ACK/NACK;
   determining a type of data stream in which the at least second part of the CSI is received;
   determining whether the type of data stream in which the at least second part of the CSI is received is equal to the predetermined type;
   scheduling the user equipment with the first transmission type when the type of data stream in which the at least second part of the CSI is received is equal to the predetermined type; and
   scheduling the user equipment with the second transmission type when the type of data stream in which the at least second part of the CSI is received is different from the predetermined type,
   wherein the type of data stream in which the first part of the CSI is received and the type of data stream in which the at least second part of the CSI is received comprises one of single and dual data streams, and wherein the transmission type is a rank of a transmission.

2. The method according to claim 1, wherein the predetermined type is a single data stream.

3. The method according to claim 1, wherein the first transmission type is a rank one transmission or a rank two transmission, and wherein the second transmission type is a rank two transmission, a rank three transmission, or a rank four transmission.

4. The method according to claim 1, wherein the at least second TTI is a second or higher TTI.

5. The method according to claim 1, wherein the communication system is an n-way transmit antenna communication system, wherein n is a positive integer larger than one.

6. A method in a user equipment for causing a base station to schedule the user equipment in a communication system, wherein the method comprises:
   determining Channel State Information, CSI, based on information about a Common Pilot Indicator CHannel, CPICH, wherein the CSI comprises at least one of a Channel Quality Information, CQI, a Rank Indicator, RI, a Precoding Control Indicator, PCI, and an Hybrid Automatic Repeat reQuest ACKnowledgement/Not ACKnowledgement, HARQ ACK/NACK;
   transmitting a first part of the CSI in a first Transmission Time Interval, TTI, to the base station, causing the base station to schedule the user equipment based on a comparison between a type of data stream the first part of the CSI is sent in and a predetermined type of data stream; and
   transmitting an at least second part of the CSI in an at least second TTI to the base station, causing the base station to further schedule the user equipment based on a comparison between a type of data stream the at least second part of the CSI is sent in and the predetermined type of data stream,
   wherein the type of data stream the first part of the CSI is sent in and the type of data stream that the at least second part of the CSI is sent in comprises one of single and dual data streams.

7. The method according to claim 6, further comprising: updating the determined CSI after the first part of the CSI has been transmitted; and wherein the at least second transmitted part is of the updated CSI.

8. The method according to claim 6, wherein the at least second TTI is a second or higher TTI.

9. The method according to claim 6, wherein the communication system is an n-way transmit antenna system, wherein n is a positive integer larger than one.

10. A base station for scheduling a user equipment in a communication system, and wherein the base station comprises:
   a receiver configured to receive a first part of Channel State Information, CSI, from the user equipment in a first Transmission Time Interval, TTI, wherein the first part of the CSI comprises at least one of a Channel Quality Information, CQI, a Rank Indicator, RI, a Precoding Control Indicator, PCI, and a Hybrid Automatic Repeat reQuest ACKnowledgement/Not ACKnowledgement, HARQ ACK/NACK; and
   the receiver further configured to receive an at least second part of the CSI from the user equipment in an at least second TTI wherein the at least second part of the CSI comprises at least one of a CQI, a RI, a PCI, and a HARQ ACK/NACK;
   a processor configured to:
      determine a type of data stream in which the first part of the CSI is received in the first TTI;
      determine whether the type of data stream in which the first part of the CSI is received is equal to a predetermined type;
      determine a type of data stream in which the at least second part of the CSI is received in the at least second TTI; and
      determine whether the type of data stream in which the at least second part of the CSI is received is equal to the predetermined type; and
   a scheduler configured to:
      schedule the user equipment with a first transmission type when the type of data stream in which the first part of the CSI is received is equal to the predetermined type;
      schedule the user equipment with a second transmission type when the type of data stream in which the first part of the CSI is received is different from the predetermined type;
      schedule the user equipment with the first transmission type when the type of data stream in which the at least second part of the CSI is received is equal to the predetermined type; and
      schedule the user equipment with the second transmission type when the type of data stream in which the at least second part of the CSI is received is different from the predetermined type,
      wherein the type of data stream in which the first part of the CSI is received and the type of data stream in which the at least second part of the CSI is received comprises one of single and dual data streams, and wherein the transmission type is a rank of a transmission.

11. The base station according to claim 10, wherein the predetermined type is a single data stream.

12. The base station according to claim 10, wherein the first transmission type is a rank one transmission or a rank two transmission, and wherein the second transmission type is a rank two transmission, a rank three transmission, or a rank four transmission.

13. The base station according to claim 10, wherein the at least second TTI is a second or higher TTI.

14. The base station according to claim 10, wherein the communication system is an n-way transmit antenna system, wherein n is a positive integer larger than one.

15. A user equipment for causing a base station to schedule the user equipment in a communication system, wherein the user equipment comprises:
   a processor configured to determine Channel State Information, CSI, based on information about a Common Pilot Indicator CHannel, CPICH, wherein the CSI comprises a Channel Quality Information, CQI, a Rank Indicator, RI, a Precoding Control Indicator, PCI, and an Hybrid Automatic Repeat reQuest ACKnowledgement/Not ACKnowledgement, HARQ ACK/NACK;
   a transmitter configured to transmit a first part of the CSI in a first Transmission Time Interval, TTI, to the base station, causing the base station to schedule the user equipment based on a comparison between a type of data stream the first part of the CSI is sent in and a predetermined type of data stream; and
   the transmitter further configured to transmit an at least second part of the CSI in an at least second TTI to the base station, causing the base station to further schedule the user equipment based on a comparison between the type of data stream the at least second part of the CSI is sent in and a predetermined type of data stream, wherein the type of data stream the first part of the CSI is sent in and the type of data stream the at least second part of the CSI is sent in comprises one of single and dual data streams.

16. The user equipment according to claim 15, wherein the processor is further configured to update the determined CSI; and wherein the at least second transmitted part is of the updated CSI.

17. The user equipment according to claim 15, wherein the at least second TTI is a second or higher TTI.

18. The user equipment according to claim 15, wherein the communication system is an n-way transmit antenna system, wherein n is a positive integer larger than one.

* * * * *